United States Patent [19]
Hu

[11] Patent Number: 5,239,916
[45] Date of Patent: Aug. 31, 1993

[54] WATERCOOL ELECTROMAGNETIC INDUCTION HEATING WOK

[76] Inventor: Lungchiang Hu, 56 Min Shen St., Fengyuan Taichung, Taiwan

[21] Appl. No.: 23,353

[22] Filed: Feb. 26, 1993

[51] Int. Cl.⁵ .................... A47J 37/10; H05B 6/12
[52] U.S. Cl. ........................ 99/422; 99/426; 99/451; 99/DIG. 14; 219/10.493; 219/10.75; 219/432; 219/456
[58] Field of Search ............. 99/331, 332, 422, 426, 99/447, 323.5, 403, 451, DIG. 14; 219/10.493, 10.75, 10.79, 10.491, 432, 456, 458, 460, 462, 463

[56] References Cited

U.S. PATENT DOCUMENTS

| | | | |
|---|---|---|---|
| 2,675,458 | 4/1954 | Stiles | 219/460 |
| 3,505,498 | 4/1970 | Shevlin | 219/432 |
| 3,699,874 | 10/1972 | Dusek | 99/323.5 |
| 4,332,188 | 6/1982 | Rhear | 99/427 |
| 4,435,638 | 3/1984 | Simon et al. | 99/426 |
| 4,458,139 | 7/1984 | McClean | 219/462 |
| 4,492,853 | 1/1985 | Lam | 99/403 |
| 4,555,616 | 11/1985 | O'Brien | 219/432 |
| 4,873,921 | 10/1989 | Piane, Sr. | 99/422 |
| 5,032,699 | 7/1991 | Hu | 99/451 |
| 5,129,314 | 7/1992 | Hu | 99/422 |

*Primary Examiner*—Timothy F. Simone

[57] ABSTRACT

A watercool electromagnetic induction heating wok comprises a power control unit connecting to an outlet of power, an induction coil composed of a hollow tube encircled to connect to the power control unit, of which cool water is filled, a cyclic watercooling system connecting to the outlet of the induction coil, and a water supply apparatus including a storage tank connecting to cyclic watercooling system and a pump connecting to the inlet of the induction coil, respectively.

4 Claims, 3 Drawing Sheets

WATERCOOL ELECTROMAGNETIC INDUCTION HEATING WOK

BACKGROUND OF THE INVENTION

The present invention relates to an electromagnetic wok, more particularly, to an electromagnetic wok which is a cooker with a cyclic watercooling system applied in big restaurants, camps or factories. The activating power for the instant invention is under 30 KW.

FIG. 1 shows the magnetic figure of prior art. Accordingly, conventional electromagnetic wok has a plurality of circular induction coil 2, on which a insulation layer 1 is disposed as shown in FIG. 1. A wok body 1A is disposed on the insulation layer 1. The circular induction coil 2 generates magnetic figure 2B to heat the wok body 1A. However, the induction coils 2 of conventional electromagnetic wok is adapted the manner of air cooling. Thus, the longer conventional electromagnetic wok is used, the higher the temperature raises. And this causes the resistant value to raise and leads to the energy loss. Hereunder are examples and calculations taken from a regular conventional electromagnetic wok of 1000 watts.

1. The heating efficiency of the best performance is 90%, and the best performance results from no superfluous objects disposed between the wok body 1A and the insulation layer 1. In addition, the thickness of the insulation layer 1 is at most 2 mm (millimeters).

2. The magnetic conductivity of the wok metal must be good. If the metal of the wok body is made of galvanized iron, the heating efficiency of the performance is approximately 80%.

3. The thickness of the wok bottom should be at least 4 mm. If so, the heating efficiency will be kept. If the thickness of the wok bottom is under 1 mm, the heating efficiency of the performance will be reduced under 80%.

To average the above-mentioned factors, the heating efficiency of the performance is approximately 80%. In the 20% loss, the induction coils shares 95% of the loss. In other words, the induction coil is responsible for 19% total power loss. Calculations are described as follows.

The induction coefficient of the iron wok is 0.3. We have power of the induction $p = 1000 \, w \times 0.9$ (real induction power) $= 900 \, w$ (watts).

Therefore, the virtual induction power of the induction coil equals to $p \div 0.3 = 3000$ VA (volt-ampere). If the induction coil has 100 V current, then $$3000 \, VA \div 100 \, V = 30 \, A.$$

The inductive reactance of the induction coil is $$R/X^L = 0.11 \, \Omega$$

and the loss is $w = I^2 \times R = 99 \, w$, $$99 \, w \div 1000 \, w = 9.9\%,$$

therefore the efficiency is 90.1%.

When the wok is made of galvanized iron, the induction coefficient is 0.1333. The real induction power $p = 3000 \, VA \times 0.1333 = 399.9 \, w$. The loss is $99 \, w \div (399.9 + 99 \, w) \approx 20\%$.

If the wok is continuously used, the temperature of the induction coil will be raised to 45° C. And the resistant value is 4.44/1000 times the temperature index of resistor per degree. $4.44/1000 \times 45°\,C. = 39.96/200$, and this means 20%, therefore $$99 \, w \times (1 + 20\%) = 120 \, w.$$

Accordingly, conventional air-cooled induction coil causing the energy waste is apparent. If the power is raised sixteen times to deal with rapid heating and cooking of the large quantities of food stuff, the power is raised to be sixteen kilo-watts, the voltage is multiplied by four, and the current should read 120 amperes. Due to the formula $p = I^2 \times R$, and the inductive reactance of the induction coil is $R/X^L = 0.11 \, \Omega$ if the original induction coil is used, thereby $p = 120 \, A \times 120 \, A \times 0.11 \, \Omega = 1.584$ KW. The heat we obtain will surely destroy the conventional air-cooled induction coil.

The watercool electromagnetic induction heating wok overcomes this shortcoming by keeping its induction coil ambient temperature, and thus, its security is granted and its life is prolonged.

SUMMARY OF THE INVENTION

The present invention has as a main objective to provide an electromagnetic wok with a cyclic watercooling system for keeping its induction coil ambient temperature and a medium or high frequency current for the induction heating, which activating power is under thirty watts.

The watercool electromagnetic induction heating wok comprises a power control unit connecting to an outlet of power, an induction coil composed of a hollow tube encircled to connect to the power control unit, of which cool water is filled, a cyclic watercooling system connecting to the outlet of the induction coil, and a water supply apparatus including a storage tank connecting to cyclic watercooling system and a pump connecting to the inlet of the induction coil, respectively.

BRIEF DESCRIPTION OF THE INVENTION

The invention is hereinafter described with reference to the accompanying drawings in which.

DETAILED DESCRIPTION OF THE INVENTION

Figure 1:
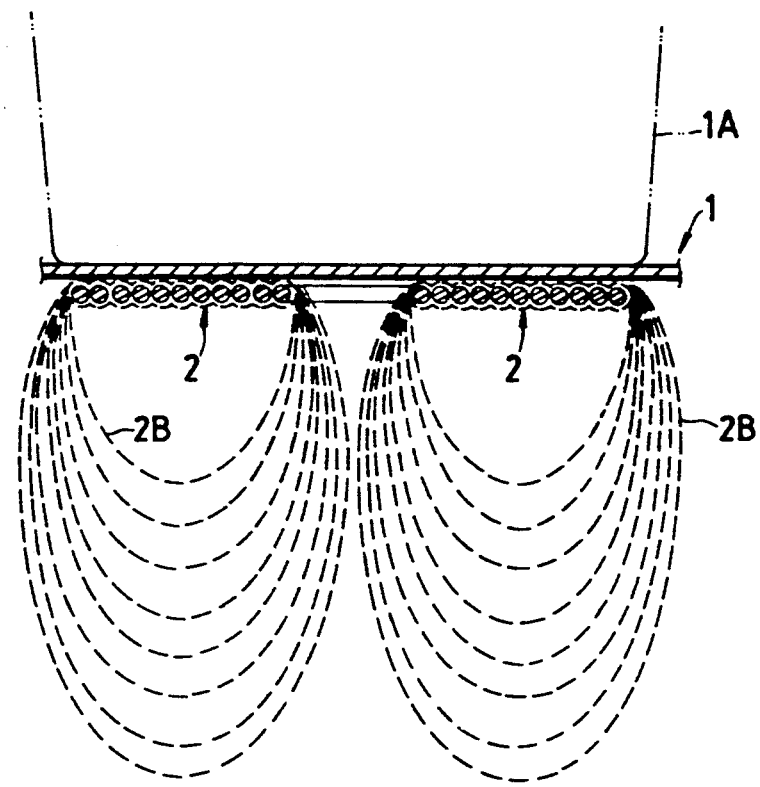
FIG. 1 is a magnetic figure of prior arts.
Figure 2:
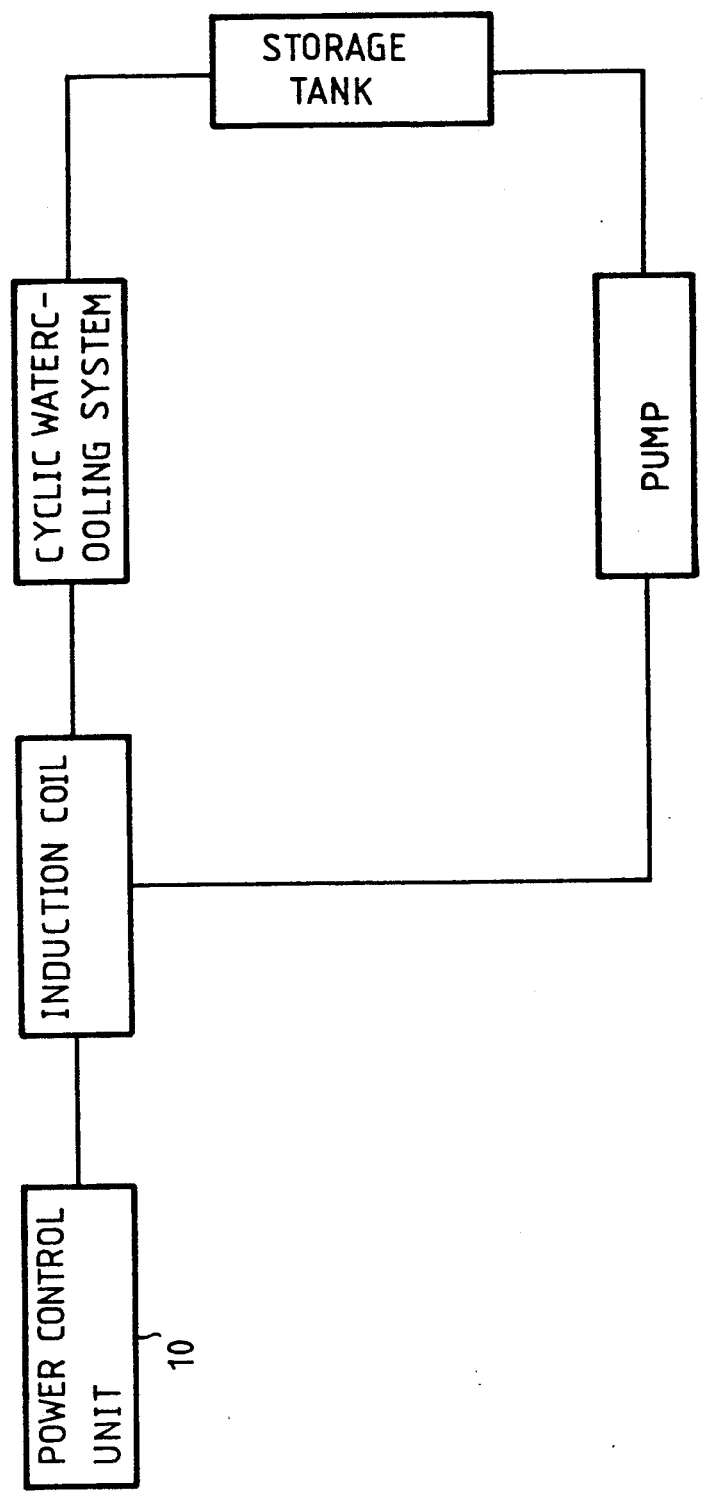
FIG. 2 is a flow chart of the preferred embodiment of the instant invention.

Referring to FIG. 2, the watercool electromagnetic induction heating wok comprises a power control unit 10 connecting to the outlet of power, an induction coil 20 composed of a hollow tube encircled to connect to a cyclic watercooling system 30 connecting to the outlet of the induction coil 20, and a water supply apparatus including a storage tank 40 connecting to the cyclic watercooling system 30 and a pump 50 connecting to the inlet of the induction coil 20, respectively. The power control unit 10 deemed to be a conventional art is not the objective of the present invention, the specification remains as it were and has no further description relating to this portion (not shown in figures.).

Figure 3:
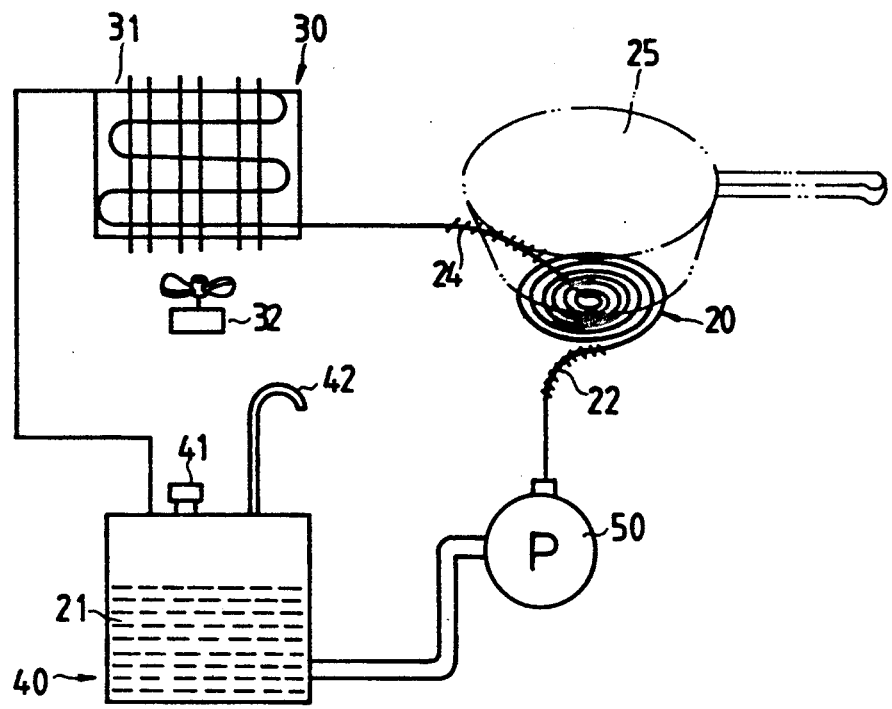
FIG. 3 is a schematic drawing illustrating the connection of the members of the preferred embodiment.

FIG. 3 shows that the induction coil 20 is defined by a hollow copper tube which is encircled and filled with cool fluid such as distilled water 21. It is ensured the tube will not be clogged with impurities to cause leakage of electricity, thanks to the insulation of the distilled water 21. Two insulating tubes 22 and 24 are curved to have the reactance and provided to connect to the inlet and outlet of the induction coil 20, respectively. A wok 25 is connected to the power control unit 10 (not shown in figures) and disposed on the induction coil 20.

The cyclic watercooling system 30 comprises a fan 32, and a radiator 31 having a first end to connect to the insulating tube 24 and a second end to connect to a storage tank 40. The distilled water 21 which passes through the insulating tubes 24 influxes the radiator 31 and passes throght the second end to flow into the storage tank 40. The fan 32 is disposed outside the radiator 31 between its first and second ends to cool down the distilled water 21 when it passes through the radiator 31. The fan 31 is optionally replaced with a heat exchanger.

Figure 4:
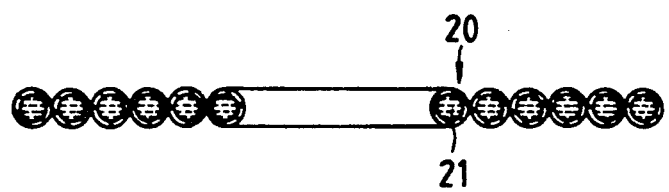
FIG. 4 is a side view of the induction coil of the preferred embodiment taken from its horizontal plane.

The storage tank 40 provided for storing the distilled water 21 which advances via the cyclic watercooling system 30 has a cover 41 and a dust-proof pressure-relieved pipe 42. The pump 50 has a first end connecting to the bottom of the storage tank 40 and a second end connecting to the inlet of the induction coil 20. The pump 50 is provided for transmitting the distilled water 21 to pass through and cool down the induction coil 20 as shown in FIG. 4.

According to the above-mentioned description, the power for the watercool electromagnetic induction heating wok is within 2 kilo-watts and 30 kilo-watts. The induction heating means the medium or high frequency power flows through the induction coil 20 to generate a magnetic field to heat the wok 25. Moreover, the ambient temperature of the induction coil 20 is kept by the feedback signal from the induction coil 20.

In this preferred embodiment, the copper tube of induction coil 20 has a 16 millimeters of outer diameter, and 12.8 millimeters of inner diameter. When the pump 50 sends 0.5 kg/cm$^3$ of distilled water 21, the volume of distilled water 21 is 4 liters per minute which enables to cool down the induction coil 20 heated by 16 kilo-watts of current.

1.584 kw (thermal loss)×0.24 (thermo-electric conversion index)≈395 calories per second.

395×60≈23.7 large calories per minute.

If the temperature of induction coil 20 raises within 10° C., the volume of distilled should be at least 23,700÷10÷1 (specific heat of water)÷1000 (cubic centimeters)=2.37 (liter per minute). Thus, 4 liters per minute of distilled water is enough to cool down the induction coil 20.

The differences between the present invention and the high electronic energy furnace are enumerated hereinafter. The high electronic energy furnace consumes a large amount of energy (usually 100~1000 kw), and its thermal loss is 35~350 kw, therefore it directly cools down the hot water in the copper tube with a huge air cooler (about 10~200 tons). However, the power for the present invention is under 30 kw (maximum). In this preferred embodiment, 16 kw of induction coil 20 only generates 1.584 kw thermal loss. To compare with 100 kw thermal loss of high electronic energy furnace, the thermal loss of the high electronic energy furnace will be 100÷1.584≈60 times that of the present invention. The present invention is therefore small and economic to the high electronic energy furnace. In addition, the distilled water 21 is sealed to be cyclic to ensure the security and energy saving and prolong the life of the induction coil 20 by preventing the impurities from clogging the copper tubes.

The curved insulation tube 22 and 24 has the reactance to reduce about a thousandth of the leakage of electricity. If 220 volts/16 kw of power is used, the thermal loss is under 16 kw, and according to the formula p=E$^2$/R, i.e., 16=220$^2$/R, we obtain R=3025 (including the values of the electric impedance and reactance). A wire provided for grounding is attached to the power control unit 10 (not shown in figures). When the leakage of electricity is over the predetermined value, the power control unit 10 will automatically shut down the power to grant the security. The medium or high frequency power in this preferred embodiment ranges from 1000 Hz to 40 KHz.

Furthermore, the water and power circuit of the present invention can be assembled and disassembled parts by parts. The present invention not only cools down the induction coil 20, but also cools down power transistor and rectifier (not shown in figures).

Further modification of the invention herein described will occur to persons skilled in the art and all such modifications are deemed to be within the scope of the invention as defined by the appended claims.

I claim:

1. A watercool electromagnetic induction heating wok comprising a power control unit connecting to an induction coil, a cyclic water cooling system and a water supply apparatus; thereof said water supply apparatus including a storage tank comprising a top cover, on which an inlet for cool fluid is disposed, a bottom, and a pump; said pump having a first end connecting to said bottom of said storage tank, a second end connecting to a first curved insulation copper tube; said storage tank loading at least four liters of said cool fluid; said induction coil composed of a hollow encircled tube including an inlet connecting to said first curved insulation copper tube and an outlet connecting to a second curved insulation copper tube which connects to said cyclic water cooling system;

said cyclic water cooling system including a fan, and a radiator made of a hollow curved copper tube having a first end connecting to said second curved insulation copper tube and a second end connecting to a copper tube which connects to said inlet of said storage tank; said fan disposed outside said radiator between its first and second ends;

a grounding wire having a first end connecting to said induction coil and a second end grounding to the ground;

whereby power initiating said pump to transmit said cool fluid to circulate within said induction coil and said radiator, and actuating said fan to cool down said cool fluid in said radiator.

2. A watercool electromagnetic induction heating wok according to claim 1, wherein said cool fluid being distilled water.

3. A watercool electromagnetic induction heating wok according to claim 1, wherein said top cover having a dust-proof pressure-relieved pipe disposed thereon.

4. A watercool electromagnetic induction heating wok according to claim 1, wherein said fan can be replaced with a heat exchanger.

* * * * *